United States Patent [19]
Scortichini et al.

[11] Patent Number: 6,072,027
[45] Date of Patent: Jun. 6, 2000

[54] PROCESS FOR PREPARING AN ELECTRICALLY CONDUCTIVE POLYMER

[75] Inventors: Carey L. Scortichini; Susan J. Babinec, both of Midland, Mich.

[73] Assignee: The Dow Chemical Company, Midland, Mich.

[21] Appl. No.: 08/972,429

[22] Filed: Nov. 18, 1997

[51] Int. Cl.⁷ .................................................... C08G 73/00
[52] U.S. Cl. ......................... 528/422; 528/412; 528/423
[58] Field of Search ..................... 528/412, 422

[56] References Cited

U.S. PATENT DOCUMENTS

| | | | |
|---|---|---|---|
| 3,963,498 | 6/1976 | Trevoy . | |
| 4,025,463 | 5/1977 | Trevoy .................... | 252/500 |
| 4,604,427 | 8/1986 | Roberts et al. ............ | 525/185 |
| 4,615,829 | 10/1986 | Tamura et al. ............ | 252/500 |
| 4,983,322 | 1/1991 | Elsenbaumer ............ | 250/500 |
| 4,986,886 | 1/1991 | Wei ......................... | 526/256 |
| 5,162,473 | 11/1992 | Jen .......................... | 526/256 |
| 5,225,109 | 7/1993 | Feldhues .................. | 526/256 |
| 5,324,453 | 6/1994 | Cao et al. ................. | 252/500 |
| 5,371,182 | 12/1994 | Galaj et al. ............... | 528/422 |
| 5,378,404 | 1/1995 | Han et al. ................. | 252/500 |
| 5,415,893 | 5/1995 | Wiersma et al. ......... | 427/385.5 |
| 5,436,317 | 7/1995 | Järvinen et al. .......... | 528/422 |
| 5,489,400 | 2/1996 | Liu et al. .................. | 252/500 |
| 5,514,771 | 5/1996 | Nakama et al. .......... | 528/423 |

FOREIGN PATENT DOCUMENTS

96/14343  5/1996  WIPO .

OTHER PUBLICATIONS

Cao, Y. et al., Polymer, vol. 30, pp. 2305–2311 (Dec. 1989).
Fong, Y. et al., Polymer, vol. 36, No. 3, pp. 639–643 (1995).
Liu, J.–M. et al., J. Chem. Soc., Chem. Commun., pp. 1529–1531 (1991).
Liu, J.–M. et al., MRL Bull. Res. Dev., vol. 6, No. 1, pp. 1–6 (1992).
Moon, D. K. et al., Makromol. Chem., vol. 193, pp. 1723–1728 (1992).
Moon, D. K. et al., Macromolecules, vol. 26, No. 25, pp. 6992–6997 (1993).
Pron, A. et al., Synthetic Metals, vol. 24, pp. 193–201 (1988).
Sun, L. et al., Mat. Res. Soc. Symp. Proc., vol. 328, pp. 167–172 (1994).
Sun, Z.–Ch. et al., "Chemical Polymerization of Aniline by Hydrogen Peroxide", International Conference on Science and Technology of Synthetic Metals, Snow Bird, Utah (Jul. 28–Aug. 2, 1996).

*Primary Examiner*—Christopher Henderson
*Attorney, Agent, or Firm*—Reid S. Willis

[57] ABSTRACT

A process for preparing a conductive polymer is described. The process comprises reacting under polymerization conditions and in the presence of a reaction medium, a conductive polymer precursor, a strong acid, and a chlorate salt or chloric acid and an iron salt. It has surprisingly been discovered that this combination of oxidants promotes higher yields of the conductive polymer than either the chlorate salt or chloric acid or the iron salt.

19 Claims, 2 Drawing Sheets

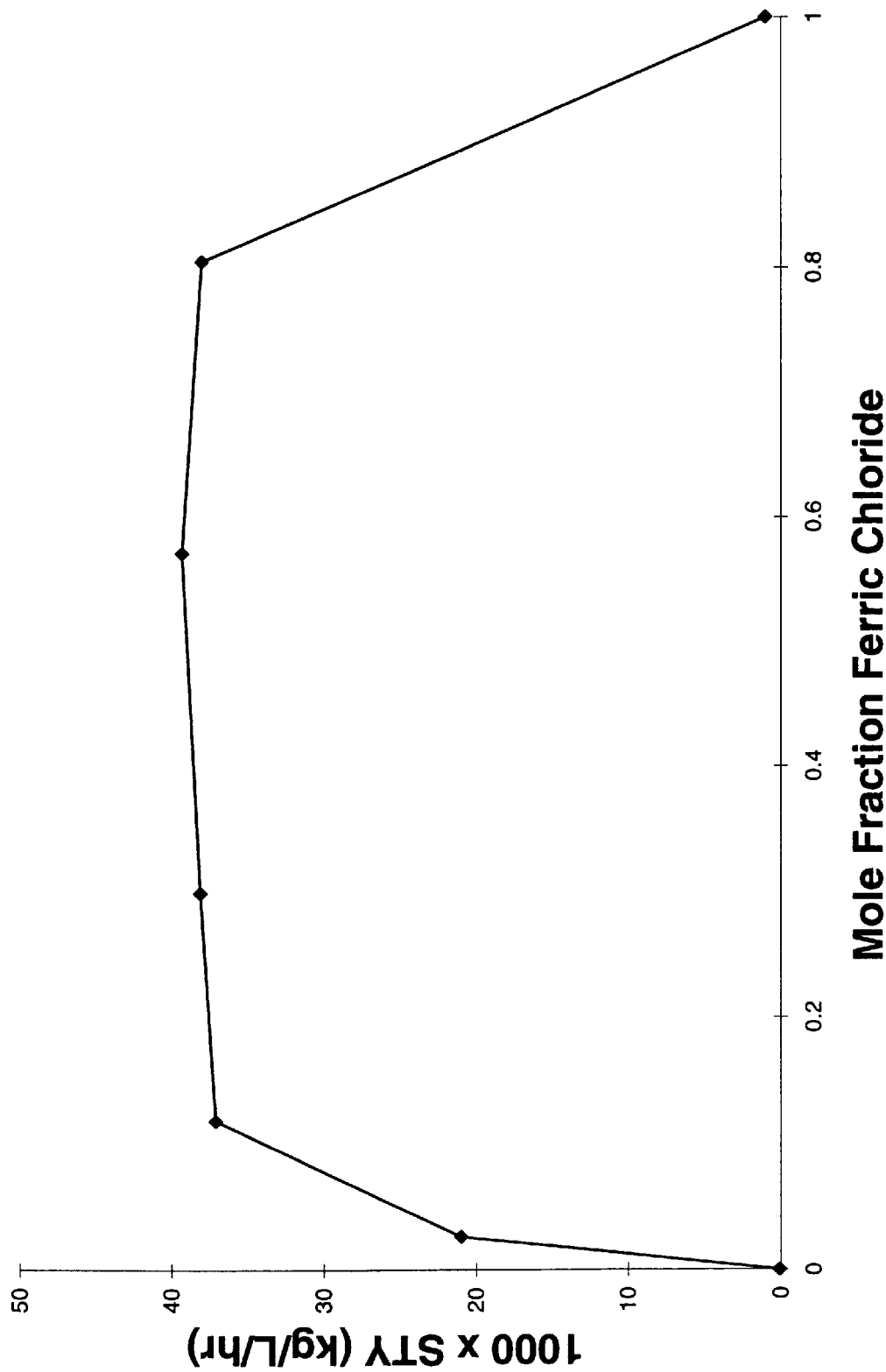

PROCESS FOR PREPARING AN ELECTRICALLY CONDUCTIVE POLYMER

BACKGROUND OF THE INVENTION

The present invention relates to a process for preparing an electrically conductive polymer, more particularly a polyaniline, a polypyrrole, or a polythiophene. Polyanilines, polypyrroles, and polythiophenes are a class of stable, intrinsically conductive, conjugated polymers, the electrical properties of which can be controlled by the degree of doping. As such, these electrically conductive polymers are useful in a variety of electrical, electrochemical, electroactive, and optical applications. Teachings of these electrically conductive polymers and their uses can be found in a number of publications, including U.S. Pat. Nos. 3,963,498; 4,025,463; 4,983,322; and 5,415,893.

Polyanilines, polypyrroles, and polythiophenes can readily be prepared from anilines, pyrroles, and thiophenes using chemical or electrochemical oxidative polymerization methods well known in the art. For example, chemical oxidation of aniline is carried out in aqueous acid solutions and in the presence of an oxidant, most notably ammonium persulfate. (See for example, U.S. Pat. Nos. 4,604,427; 5,324,453; and 5,371,182; and Cao et al. in *Polymer*, Vol. 30, pp. 2305–2311 (1989)). Although persulfates are among the most effective and widely used oxidants, they are expensive. Therefore, it would be desirable to find an alternative oxidant that promotes the formation of highly electrically conductive polymers at high yields.

Ferric chloride is a common oxidant used particularly for pyrroles and thiophenes. Inasmuch as ferric chloride use leads to significant problems in waste disposal, it would further be advantageous to discover an oxidant that, at the very least, reduces the amount of ferric chloride required to produce the polymer in acceptable yields.

SUMMARY OF THE INVENTION

The present invention addresses the deficiencies of the art by providing a process for preparing a conductive polymer comprising reacting, under polymerization conditions, a mixture of a conductive polymer precursor, a strong acid, a chlorate salt or chloric acid, an iron salt, and a reaction medium, wherein the conductive polymer precursor is an aniline represented by the following structure:

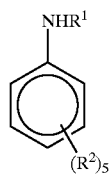

or a thiophene or a pyrrole represented by the following structure:

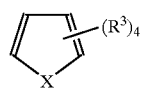

wherein $R^1$ is hydrogen, $C_1$–$C_{20}$-alkyl, aryl, or substituted aryl; each $R^2$ is independently hydrogen, alkyl, cycloalkyl, alkenyl, aryl, arylalkyl, hydroxy, alkoxy, halo, or nitro, with the proviso that at least one of $R^2$ is hydrogen, halo, or alkoxy; X is N—$R^4$ or S; each $R^3$ is independently hydrogen, alkyl, cycloalkyl, alkenyl, aryl, arylalkyl, hydroxy, alkoxy, halo, or nitro, with the proviso that at least two of $R^3$ are each independently hydrogen, halo, or alkoxy; and $R^4$ is $C_1$–$C_{20}$-alkyl, aryl, or substituted aryl.

In another aspect, the present invention is a process for preparing polyaniline comprising reacting at a temperature in the range of about 20° C. to about 40° C., and at a pH of from about 0 to about 1, a mixture of water, acetonitrile, aniline, HCl, p-toluenesulfonic acid, $FeCl_2$ or $FeCl_3$, and sodium or potassium chlorate, wherein the volume percent acetonitrile based on the total volume of water and acetonitrile is from about 10 to 90; the aniline has an initial concentration in the mixture of from about 0.1 M to about 2 M, based on the volume of the mixture; the initial mole-to-mole ratio of the sodium or potassium chlorate to the $FeCl_2$ or $FeCl_3$ is from about 1:2 to about 50:1; the aniline, the sodium or potassium chlorate, and the $FeCl_3$ are used in such proportions so as to provide a total oxidizing equivalent number of from about 3 to about 4.

Surprisingly, the combination of a chlorate salt or chloric acid with a salt of Fe(II) or Fe(III) provides an oxidant that promotes higher yields of the conductive polymer than either the chlorate salt or chloric acid, or the salt of Fe(II) or Fe(III) alone.

BRIEF DESCRIPTION OF DRAWINGS

FIG. 2 is a graph of the Space Time Yield (STY) versus the mole fraction of $FeCl_3$.

DETAILED DESCRIPTION OF THE INVENTION

Figure 1:
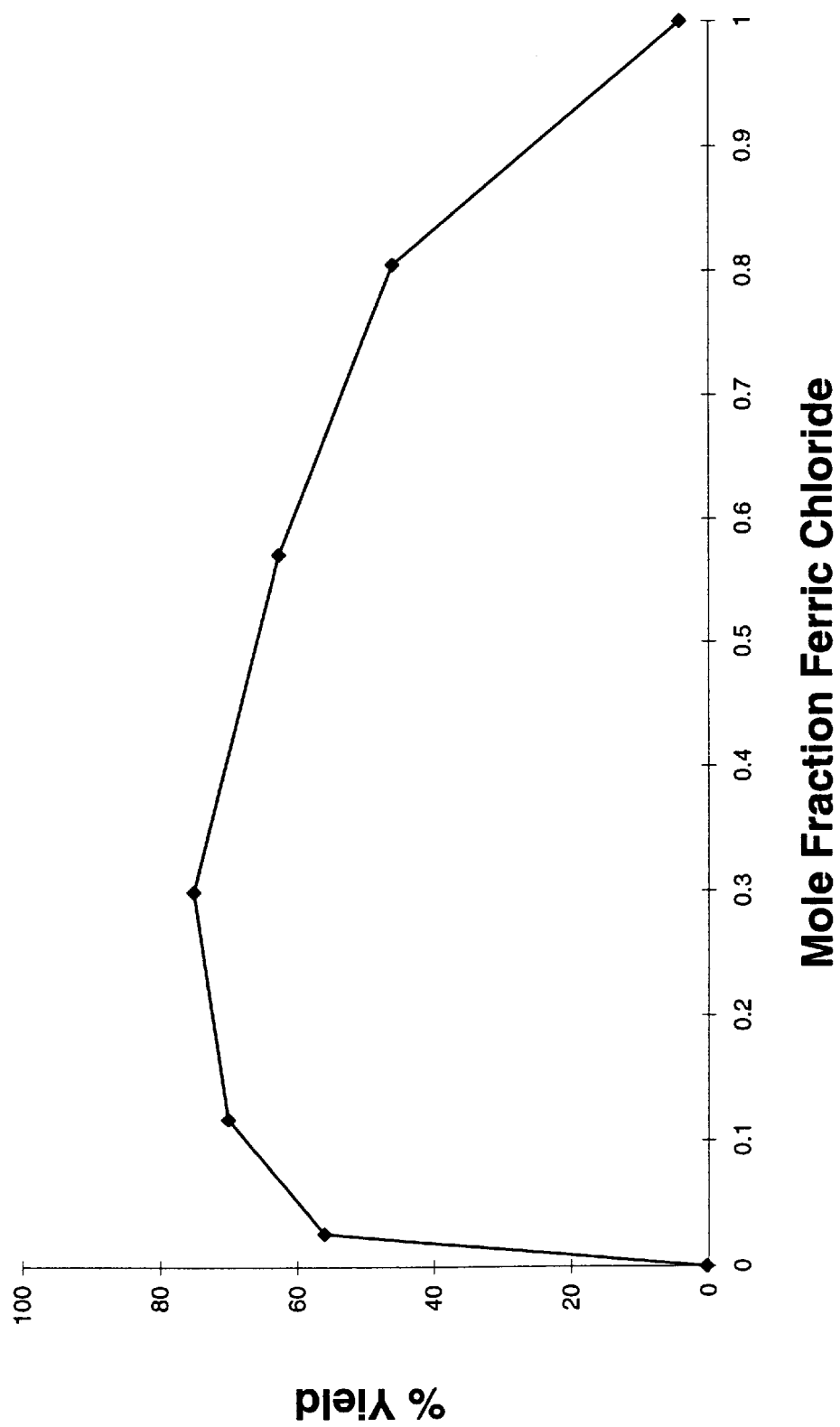
FIG. 1 is a graph of the percent yield of the polyaniline versus the mole fraction of $FeCl_3$ (moles of $FeCl_3$/(moles of sodium chlorate+moles of $FeCl_3$)).

In the method of the present invention, a conductive polymer precursor is polymerized under such conditions to form the corresponding conductive polymer. The term "conductive polymer precursor" is used herein to refer to an aniline, a pyrrole, a thiophene, or a combination thereof. Similarly, the term "conductive polymer" is used herein to refer to a polyaniline, a polypyrrole, or a polythiophene, or a combination thereof.

Anilines that are suitable as conductive polymer precursors can be represented by the following structure:

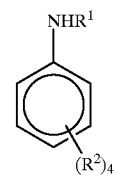

where $R^1$ is hydrogen, $C_1$–$C_{20}$-alkyl, aryl, or substituted aryl, and each $R^2$ is independently hydrogen, alkyl, cycloalkyl, alkenyl, aryl, arylalkyl, hydroxy, alkoxy, halo, or nitro, with the proviso that at least one of $R^2$ is hydrogen, halo, or alkoxy. $R_1$ is preferably hydrogen or $C_3$–$C_{12}$-alkyl; more preferably hydrogen or $C_4$–$C_8$-alkyl; and most preferably hydrogen. Each $R^2$ is preferably independently hydrogen, $C_1$–$C_4$-alkyl, hydroxy, $C_1$–$C_4$-alkoxy, chloro, or nitro, with the proviso that at least the $R^2$ para to $NHR^1$ is hydrogen, halo, or alkoxy; more preferably, each $R^2$ is independently hydrogen, methyl, ethyl, hydroxy, chloro, bromo, or nitro, with the proviso that the $R^2$ para to $NHR^1$ is hydrogen; and most preferably each $R^2$ is hydrogen.

Examples of preferred anilines include aniline (aminobenzene), o-methylaniline, o-ethylaniline, o-n-propylaniline, o-methoxyaniline, o-ethoxyaniline, N-n-butylaniline, N-n-hexylaniline, and N-n-octylaniline. The more preferred of the anilines is aniline.

Pyrroles and thiophenes that are suitable as conductive polymer precursors can be represented by the following structure:

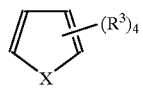

wherein X is N—$R^4$ or S, each $R^3$ is independently hydrogen, alkyl, cycloalkyl, alkenyl, aryl, arylalkyl, hydroxy, alkoxy, halo, or nitro, with the proviso that at least two of $R^3$ are independently hydrogen, halo, or alkoxy; and $R^4$ is $C_1$–$C_{20}$-alkyl, aryl, or substituted aryl. Preferably, each $R^3$ is independently hydrogen, $C_1$–$C_{20}$-alkyl, hydroxy, $C_1$–$C_4$-alkoxy, chloro, or nitro, with the proviso that at least the two $R^3$ ortho to X are each independently hydrogen, halo, or alkoxy; more preferably each $R^3$ is independently hydrogen, methyl, hydroxy, chloro, or nitro, with the proviso that at least the two $R^3$ ortho to X are hydrogen; and most preferably each $R^3$ is hydrogen. Preferably, $R^4$ is hydrogen or $C_1$–$C_{12}$-alkyl, more preferably hydrogen or $C_1$–$C_8$-alkyl, and most preferably hydrogen.

Examples of pyrroles and thiophenes suitable as conductive polymer precursors include pyrrole, N-methylpyrrole, N-ethylpyrrole, N-n-propylpyrrole, N-n-butylpyrrole, N-phenylpyrrole, N-tolylpyrrole, 3-methylpyrrole, 3,4-dimethylpyrrole, 3-ethoxypyrrole, 3-chloropyrrole, 3-bromopyrrole, thiophene, ethylene dioxythiophene, 3-methylthiophene, 3,4-dimethylthiophene, 3-ethoxythiophene, 3-chlorothiophene, and 3-bromothiophene. The preferred pyrrole is pyrrole, and preferred thiophenes are thiophene and ethylene dioxythiophene. The preferred conductive polymer precursor is an aniline.

The polymerization reaction is carried out by combining under polymerization conditions the aniline, a solvent, an oxidant, and a strong acid. The reaction is preferably carried out at ambient pressure and at a temperature of preferably not less than about −10° C., more preferably not less than about 0° C., and most preferably not less than about 20° C.; and preferably not greater than about 100° C., more preferably not greater than about 50° C., and most preferably not greater than about 40° C.

Strong acids suitable for the promotion of polymerization of the conductive polymer precursor and consequent doping of the polymer include hydrochloric acid, hydrobromic acid, sulfuric acid, phosphoric acid, tetrafluoroboric acid, hexafluorophosphoric acid, perchloric acid, formic acid, acetic acid, trifluoroacetic acid, methanesulfonic acid, trifluoromethanesulfonic acid, dinonylnaphthalenesulfonic acid, poly(styrenesulfonic acid), poly(acrylic acid), dodecylbenzenesulfonic acid, p-toluenesulfonic acid (p-TSA), and combinations thereof. Hydrochloric acid, sulfuric acid, and p-TSA are preferred strong acids, and a combination of hydrochloric acid and p-TSA is more preferred.

The role of the p-TSA is primarily that of a dopant, while the HCl appears to serve to control the rate of reaction as well as the selectivity of conductive polymer formation. The total acid employed is such that the reaction mixture is maintained at a pH of preferably not greater than about 5, more preferably not greater than about 2, and most preferably not greater than about 1; and preferably not less than about −1, more preferably not less than about 0. In a most preferred method of the present invention, p-TSA is used approximately stoichiometrically with respect to the aniline, and sufficient HCl is added to the reaction mixture to maintain a pH in the range of about 0 to about 1.

The oxidant is a combination of a chlorate salt or chloric acid and a salt of Fe(II) or Fe(III) (hereinafter referred to in combination as the iron salt). Examples of suitable chlorate salts include, but are not restricted to, lithium chlorate, sodium chlorate, potassium chlorate, calcium chlorate, and magnesium chlorate. Preferred chlorate salts are sodium chlorate and potassium chlorate. Suitable iron salts include, but are not restricted to, $FeF_3$, $FeCl_3$, $FeBr_3$, $FeI_3$, $Fe_2O_3$, $Fe(OH)_3$, $Fe_2(SO_4)_3$, $K_3Fe(CN)_6$, $K_3Fe(C_2O_4)_3$, $FeF_2$, $FeCl_2$, $FeBr_2$, $FeI_2$, $FeO$, $FeSO_4$, and $K_4Fe(CN)_6$. Preferred iron salts are $FeCl_3$, $FeCl_2$, $FeBr_3$, $FeBr_2$, $FeSO_4$, and $Fe_2(SO_4)_3$, or a combination thereof. More preferred iron salts are $FeCl_2$, $FeCl_3$, and $FeBr_3$, with $FeCl_2$ and $FeCl_3$ being most preferred. Iron salts may be anhydrous or hydrated, but are preferably hydrated.

The conductive polymer precursor, the acid, and the oxidant are dispersed or dissolved in the reaction medium. The reaction medium may be aqueous or non-aqueous, or a combination of water and a common organic solvent that is not substantially oxidized by the oxidant. The reaction mixture may be single-phase (that is, a solution) or multiphasic (for example, an aqueous emulsion or a dispersion). Preferably, the reaction medium is water or a combination of water and acetone, tetrahydrofuran, sulfolane, propylene carbonate, ethylene carbonate, or acetonitrile, or a combination thereof. More preferably, the reaction medium is water or a combination of water and acetonitrile. Most preferably, the reaction medium is water and acetonitrile.

It has been surprisingly discovered that in certain cases, a mixture of water and acetonitrile advantageously promotes the solubility of the conductive polymer precursor in the reaction medium, which promotion favors higher throughputs of the conductive polymer. Acetonitrile and water are particularly favorable where an aniline and a sulfonic acid are present. Preferably, the reaction medium contains not less than about 5 volume percent, more preferably not less than about 10 volume percent, and most preferably not less than about 20 volume percent acetonitrile based on the volume of water and acetonitrile; and preferably not more than about 90 volume percent, more preferably not more than about 60 volume percent, and most preferably not more than about 40 volume percent acetonitrile, based on the volume of water and acetonitrile.

The preferred mole-to-mole ratio of the chlorate salt or chloric acid to the iron salt depends on the concentration of the conductive polymer precursor in the mixture. As the concentration of the conductive polymer precursor is increased, the optimal ratio of the chlorate salt or chloric acid to the iron salt also increases. This circumstance is fortuitous since it is desirable to have both a high concentration of the conductive polymer precursor and a high mole-to-mole ratio of the chlorate to the iron salt. (Presently, the cost per equivalent of iron chloride is about six times higher than the cost per equivalent of sodium chlorate.) In addition to any cost savings, it is further desirable to reduce the amount of the iron salt used in the preparation of the conductive polymer because the iron salt presents a waste disposal problem, particularly in large scale processes.

Preferably, the initial concentration of the conductive polymer precursor, preferably aniline (at time=0) is not less than 0.01 M, more preferably not less than 0.1 M, and most preferably not less than 0.5 M, based on the total volume of the reaction mixture; and preferably not greater than 5 M, more preferably not greater than 3 M, and most preferably not greater than 2 M.

The initial mole-to-mole ratio of the chlorate salt or chloric acid to the iron salt is preferably not less than about 1:4, more preferably not less than about 1:2, and most preferably not less than about 2:1; and preferably not greater than about 200:1, more preferably not greater than about 100:1, and most preferably not greater than about 50:1. Preferably, the initial mole-to-mole ratio of the chlorate salt or chloric acid to the aniline is not less than about 0.050:1, more preferably not less than about 0.1:1, and most preferably not less than 0.2:1; and preferably not greater than about 2:1, more preferably not greater than about 1:1, and most preferably not greater than about 0.75:1. Preferably, the initial mole-to-mole ratio of the iron salt to the aniline is not less than about 0.001:1, more preferably not less than about 0.005:1, and most preferably not less than about 0.01:1; and preferably not greater than about 1.5:1, more preferably not greater than about 1:1, and most preferably not greater than about 0.7:1.

The preferred total oxidizing equivalent number (TOE) is not less than about 0.3, more preferably not less than about 1, and most preferably not less than about 3; and preferably not more than about 12, more preferably not more than about 6, and most preferably not more than about 4. The TOE is defined as:

(moles of iron salt+6 ×moles of chlorate)/moles of the conductive polymer precursor The conductivity of the conductive polymer obtained by the process of the present invention is preferably at least $10^{-9}$ Siemens/cm (S/cm), more preferably at least 0.01 S/cm, and most preferably at least 0.1 S/cm. The conductivity may be determined by first isolating the conductive polymer from the polymerization reaction product, and drying the conductive polymer under dynamic vacuum at 45° C. overnight. A disc-shaped pellet (typically having a surface area of about 1 cm$^2$ and a length of about 100 mm) is made from the dried polymer using a press, then painted on opposing surfaces with a conductive primer. The resistance is measured from one surface to the other using a multimeter. The conductivity is calculated by dividing the distance between the two surfaces by the area of the painted surface and by the resistance, in ohms, to give the conductivity in S/cm.

Referring now to FIG. 1, which is a graph of the percent yield of polyaniline doped with p-TSA (based on aniline added to the reactor) versus the mole fraction of FeCl$_3$ (moles of FeCl$_3$/moles of sodium chlorate), the graph shows a synergistic effect throughout the range. Thus, any combination of FeCl$_3$ and sodium chlorate results in a greater yield of the polyaniline than either FeCl$_3$ or sodium chlorate. FIG. 1 also shows that the optimal mole-to-mole ratio of sodium chlorate to FeCl$_3$ is from about 2:1 to about 50:1. The reaction conditions are outlined in Table 1 in the example section.

Referring now to FIG. 2, which is a graph of the STY versus mole fraction of FeCl$_3$, the graph shows a dramatic and surprising increase in throughput across the range. Again, as in FIG. 1, any combination of FeCl$_3$ and sodium chlorate results in an improved throughput as compared to either FeCl$_3$ or sodium chlorate.

The process of the present invention can be done at the site of use of the conductive organic polymer. For example, a coating containing aniline may be formed on a surface, then exposed to oxidant under the conditions described hereinabove to produce a coating containing polyaniline.

Similarly, a particle of a plastic such as nylon may be swelled with aniline, then exposed to the oxidant to produce a nylon particle containing polyaniline.

Conductive polymers act as rust inhibitors, and are therefore useful as undercoatings in automobiles and airplanes, for example. These conductive polymers are also useful as coatings to improve static dissipation on fibers, films, housings, clean rooms, hospitals, and electronic components; or as conductive fillers or coatings onto fillers such as glass, talc, carbon, or polymer beads to make a conductive filler material.

The following examples are for illustrative purposes only and are not intended to limit the scope of this invention.

EXAMPLES 1–5

Polymerization of Aniline using Sodium Chlorate and Ferric Chloride

Water, acetonitrile, aniline, p-toluenesulfonic acid hydrate (p-TSA), and aqueous HCl are added to a jacketed 1-liter reactor equipped with a mechanical stirrer. Heat transfer fluid is circulated through the jacket to control the temperature of the reactor contents. Ferric chloride hexahydrate (Comparative Example 1 and Examples 1–5) is added in one portion to the solution with stirring; after 15 minutes, a concentrated aqueous solution of sodium chlorate (Comparative Example 2 and Examples 1–5) is added dropwise to the solution. After the desired conversion of the aniline, the reaction mixture is suction filtered using a medium porosity glass filter funnel, washed with 0.1 M p-TSA in water, then washed with 0.1 M p-TSA in methanol. The solid polyaniline is then dried in vacuum at 50° C.

EXAMPLE 6

Polymerization of Aniline using Sodium Chlorate and Ferrous Chloride

The procedure is carried out as described for Examples 1–5 except that ferrous chloride tetrahydrate is used in place of ferric chloride hexahydrate.

Table 1 summarizes the concentration of the various reagents, the conversion of the aniline, the yield of the polyaniline, the space time yield (STY, defined as kg of doped polyaniline recovered divided by the reaction time in hours and the reaction mixture volume in liters), and the conductivity. The reactions are carried out at about 33° C. The yield of polyaniline, based on aniline added to the reactor, versus mole fraction of FeCl$_3$ (Comparative Examples 1 and 2, and Examples 1–5) is graphically depicted in FIG. 1, and the space time yield (STY, the throughput) versus mole fraction of FeCl$_3$ is graphically depicted in FIG. 2.

Aniline concentration (M) is moles of aniline divided by total volume (L) of water, acetonitrile, aniline, HCl, oxidant, and p-TSA. HCl concentration is similarly defined. H$_2$O w/NaClO$_3$ refers to the amount of water that is added to the NaClO$_3$. FeCl$_3$/aniline, FeCl$_2$/aniline, NaClO$_3$/aniline, and p-TSA/aniline are all mol/mol ratios.

TABLE 1

| Example No. | Comp 1 | Comp 2 | 1 | 2 | 3 | 4 | 5 | 6 |
| --- | --- | --- | --- | --- | --- | --- | --- | --- |
| H$_2$O (mL) | 150 | 300 | 225 | 300 | 300 | 300 | 300 | 300 |
| acetonitrile (mL) | 40 | 80 | 60 | 80 | 80 | 80 | 80 | 80 |
| 12M HCl (mL) | 9.5 | 19 | 14.3 | 19 | 19 | 19 | 19 | 19 |
| aniline (g) | 31.82 | 63.5 | 47.6 | 63.5 | 63.5 | 63.5 | 63.5 | 63.5 |
| p-TSA hydrate (g) | 64.87 | 129.7 | 97.3 | 129.7 | 129.7 | 129.7 | 129.7 | 129.7 |
| FeCl$_3$.6H$_2$O (g) | 312.1 | 0 | 190.8 | 113.4 | 41.4 | 13.5 | 2.72 | — |
| FeCl$_2$.4H$_2$O (g) | — | — | — | — | — | — | — | 9.9 |
| NaClO$_3$ (g) | 0 | 40.89 | 18.14 | 33.47 | 38.15 | 40.00 | 40.71 | 40.91 |
| H$_2$O w/NaClO$_3$ (mL) | 0 | 50 | 25 | 40 | 50 | 50 | 50 | — |

TABLE 1-continued

| Example No. | Comp 1 | Comp 2 | 1 | 2 | 3 | 4 | 5 | 6 |
|---|---|---|---|---|---|---|---|---|
| total volume (L) | 0.48 | 0.642 | 0.581 | 0.699 | 0.666 | 0.650 | 0.644 | 0.650 |
| aniline (M) | 0.71 | 1.06 | 0.88 | 0.98 | 1.02 | 1.05 | 1.06 | 1.05 |
| HCl (M) | 0.24 | 0.36 | 0.30 | 0.33 | 0.34 | 0.35 | 0.35 | 0.35 |
| $FeCl_3$/aniline (m/m) | 3.38 | 0 | 1.38 | 0.62 | 0.22 | 0.073 | 0.015 | — |
| $FeCl_2$/aniline (m/m) | — | — | — | — | — | — | — | 0.073 |
| $NaClO_3$/aniline (m/m) | 0 | 0.56 | 0.33 | 0.46 | 0.53 | 0.55 | 0.56 | 0.56 |
| p-TSA/aniline (m/m) | 1.00 | 1.00 | 1.00 | 1.00 | 1.00 | 1.00 | 1.00 | 1.00 |
| reaction time (min) | 325 | 330 | 113 | 165 | 214 | 210 | 300 | 218 |
| conversion (% aniline) | * | <1 | 56.25 | 85.43 | 96.65 | 89.88 | 73.13 | 87.28 |
| yield (% polyaniline) | 4.26 | 0.29 | 46.06 | 62.75 | 75.12 | 70.14 | 56.03 | 70.88 |
| 1000 × STY (kg/L/hr) | 1.0 | 0.1 | 38.0 | 39.3 | 38.1 | 37.1 | 21.0 | 36.3 |
| conductivity (S/cm) | 3.8 | 1.4 | 0.4 | 5.4 | 1.5 | 2.4 | 0.9 | 1.1 |

*The conversion of aniline monomer was not measurable due to the high iron content of the reaction mixture.

What is claimed is:

1. A process for preparing a conductive polymer comprising reacting in a reaction medium under polymerization conditions, a mixture of a conductive polymer precursor, a strong acid, a chlorate salt or chloric acid, and an iron salt, wherein the conductive polymer precursor is an aniline represented by the following structure:

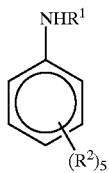

where $R^1$ is hydrogen, $C_1$–$C_{20}$-alkyl, aryl, or substituted aryl; and each $R^2$ is independently hydrogen, alkyl, cycloalkyl, alkenyl, aryl, arylalkyl, hydroxy, alkoxy, halo, or nitro, with the proviso that at least one of $R^2$ is hydrogen, halo, or alkoxy.

2. The process of claim 1 wherein $R^1$ is hydrogen, or $C_4$–$C_8$-alkyl; and each $R^2$ is independently hydrogen, methyl, hydroxy, chloro, or nitro.

3. The process of claim 2 wherein $R^1$ and each $R^2$ are H.

4. The process of claim 1 wherein the strong acid comprises a mixture of p-toluenesulfonic acid and HCl.

5. The process of claim 4 wherein the mole-to-mole ratio of the chlorate salt or chloric acid to the iron salt is from about 1:4 to about 200:1.

6. The process of claim 5 wherein the mole-to-mole ratio of the chlorate salt or chloric acid to the iron salt is from about 1:1 to about 100:1.

7. The process of claim 3 wherein the wherein the mole-to-mole ratio of the chlorate salt or chloric acid to the iron salt is from about 2:1 to about 50:1.

8. The process of claim 1 wherein the mole-to-mole ratio of the chlorate salt or chloric acid to the aniline is from about 0.1:1 to about 1:1.

9. The process of claim 7 wherein the mole-to-mole ratio of the chlorate salt or chloric acid to the aniline is from about 0.2:1 to about 0.5:1.

10. The process of claim 1 wherein the mole-to-mole ratio of the iron salt to the aniline is from about 0.001:1 to about 1.5:1.

11. The process of claim 9 wherein the mole-to-mole ratio of the iron salt to the aniline is from about 0.01:1 to about 0.7:1.

12. The process of claim 3 wherein the concentration of the aniline is from about 0.01 M to about 3 M.

13. The process of claim 11 wherein the concentration of the aniline is from about 0.1 M to about 1.5 M.

14. The process of claim 1 wherein the reaction medium is water or a mixture of water and acetone, tetrahydrofuran, propylene carbonate, sulfolane, ethylene carbonate, or acetonitrile.

15. The process of claim 13 wherein the reaction medium water and acetonitrile, and wherein volume percent acetonitrile based on the total volume of water and acetonitrile is from about 10 to about 60.

16. The process of claim 1 wherein the iron salt is $FeF_3$, $FeCl_3$, $FeBr_3$, $FeI_3$, $Fe_2O_3$, $Fe(OH)_3$, $Fe_2(SO_4)_3$, $K_3Fe(CN)_6$, $K_3Fe(C_2O_4)_3$, $FeF_2$, $FeCl_2$, $FeBr_2$, $FeI_2$, $FeO$, $FeSO_4$, or $K_4Fe(CN)_6$; and the chlorate salt is lithium chlorate, sodium chlorate, potassium chlorate, calcium chlorate, or magnesium chlorate.

17. The process of claim 3 wherein the iron salt is $FeCl_3$, $FeCl_2$, $FeBr_3$, $FeBr_2$, $FeSO_4$, or $Fe_2(SO_4)_3$; and the chlorate salt is sodium chlorate and potassium chlorate.

18. The process of claim 15 wherein the iron salt is $FeCl_3$, or $FeBr_3$; and the chlorate salt is sodium chlorate.

19. A process for preparing polyaniline comprising reacting at a temperature in the range of about 20° C. to about 40° C., and at a pH of from about 0 to about 1, a mixture of water, acetonitrile, aniline, HCl, p-toluenesulfonic acid, $FeCl_2$ or $FeCl_3$, and sodium or potassium chlorate, wherein the volume percent acetonitrile based on the total volume of water and acetonitrile is from about 10 to 90; the aniline has an initial concentration in the mixture of from about 0.1 M to about 2 M, based on the volume of the mixture; the initial mole-to-mole ratio of the sodium or potassium chlorate to the $FeCl_2$ or $FeCl_3$ is from about 1:2 to about 50:1; the aniline, the sodium or potassium chlorate, and the $FeCl_3$ are used in such proportions so as to provide a total oxidizing equivalent number of from about 3 to about 4.

* * * * *